D. W. SOWERS & H. D. WALKER.
MEANS FOR COUPLING ROTATABLE DEVICES.
APPLICATION FILED OCT. 19, 1909.
1,128,069.
Patented Feb. 9, 1915
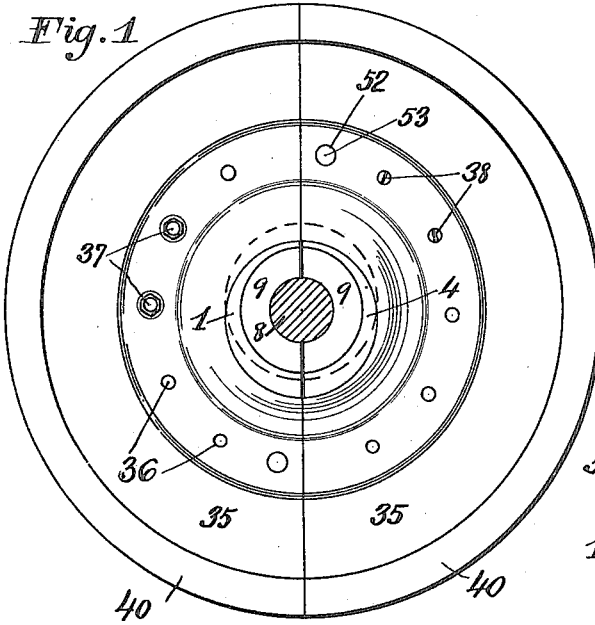
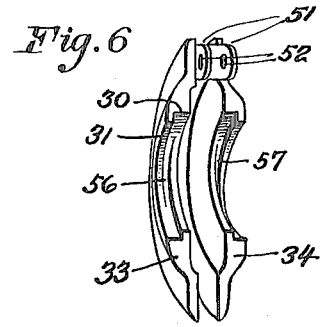
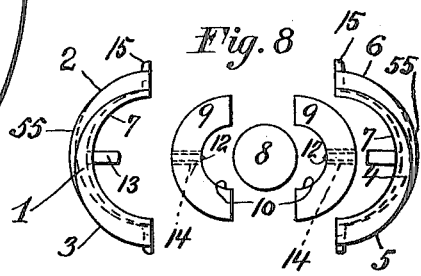
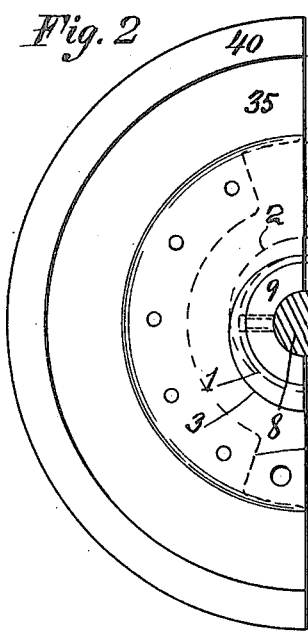
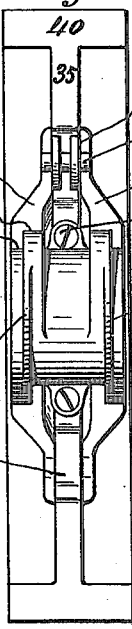
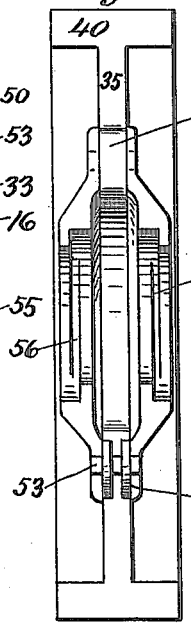
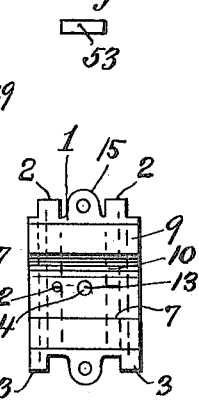
David W. Sowers
Hugh D. Walker
Inventors
By their Attorney
Alexander C. Prousfit

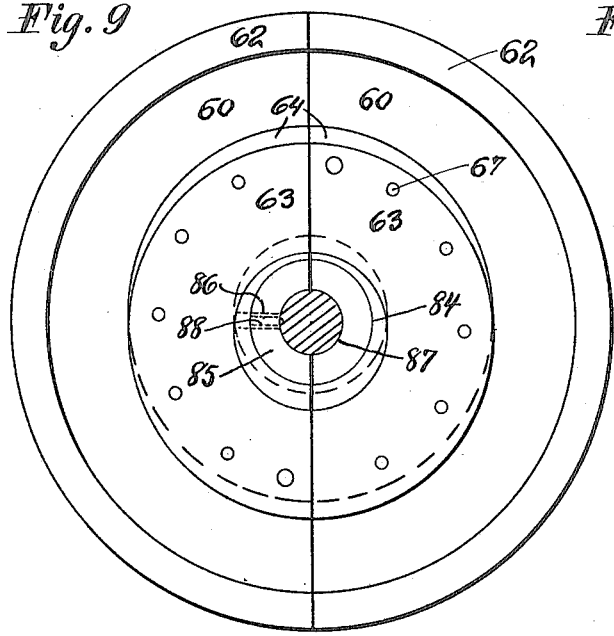
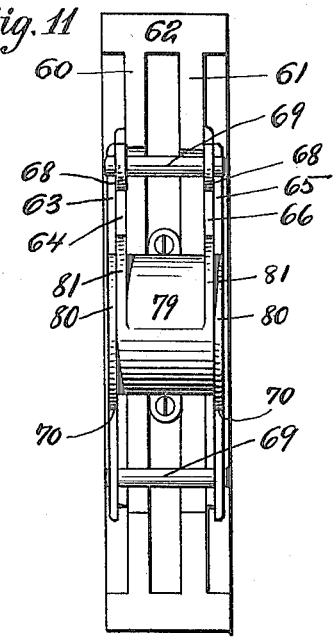
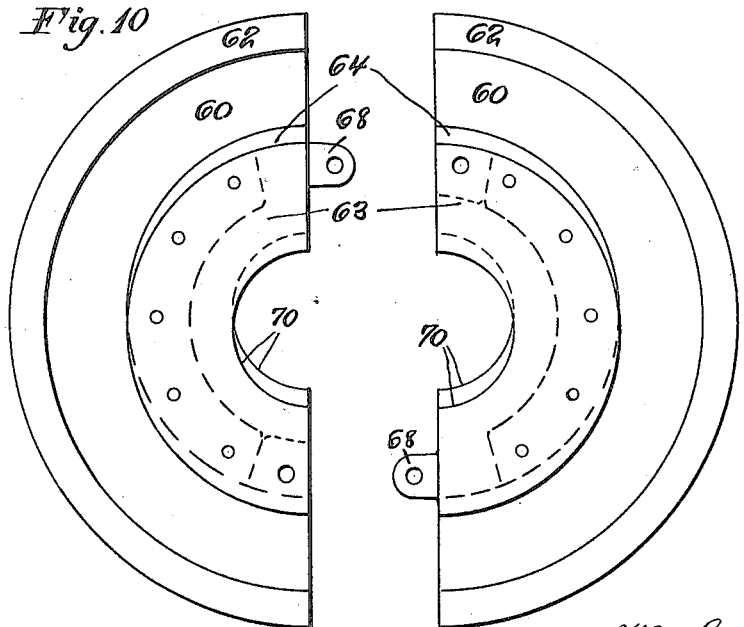
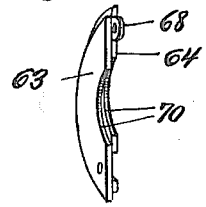
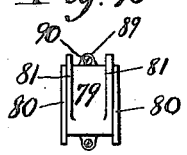

UNITED STATES PATENT OFFICE.

DAVID W. SOWERS, OF BUFFALO, NEW YORK, AND HUGH D. WALKER, OF GRIMSBY, ONTARIO, CANADA.

MEANS FOR COUPLING ROTATABLE DEVICES.

1,128,069.  Specification of Letters Patent.  Patented Feb. 9, 1915.

Application filed October 19, 1909. Serial No. 523,457.

*To all whom it may concern:*

Be it known that we, DAVID W. SOWERS, of Buffalo, Erie county, New York, and HUGH D. WALKER, of Grimsby, Lincoln county, Ontario, Canada, have invented certain new, original, and useful Improvements in Means for Coupling Rotatable Devices, of which the following is a full, clear, and accurate description, like letters and numerals in the drawings and description designating like parts.

This invention relates to power transmitting apparatus and is of particular utility when used to secure a split pulley upon its shaft for co-rotation therewith, although we contemplate the use of our invention in any field for which it is adapted by the nature of our improvements.

An important object of our invention is to provide wedging means constructed and arranged to be brought into action by the torque resulting from relative rotation of the rotatable members which are to be coupled, with respect to each other, and to arrange the wedging means so that the rotatable members will be connected for co-rotation as a substantially unitary structure when wedged during rotation in either direction, whether the power be applied to one rotatable member or to the other, as for example whether a pulley is to be used to drive a shaft in one direction or the other, and also if the shaft is to be used to drive the pulley in one direction or the other.

Another object of importance provided for by our invention is the construction of the connections so that at a predetermined relative position of the rotatable members they can be readily separated, this arrangement being such that if a pulley is to be attached to a shaft, or removed therefrom, the pulley can be withdrawn substantially in the plane of its rotation, in order to permit our improved pulleys to be placed in very close juxtaposition upon the shaft, which is frequently a very desirable arrangement, and is difficult if not impossible to obtain with many types of pulleys in present use.

Still another important feature of our invention is to provide the wedging means in such a form that the part of the rotatable member selected for its embodiment can be constructed in standard sizes, each capable of application to a number of different sizes of rotatable members, as for example to shafts of different diameters, and to pulleys of different widths and diameters; and also to pulleys having a single web or a plurality of webs.

Any suitable means may be employed to effect the wedging action, but we prefer to utilize oppositely-disposed eccentric hub members, and in coöperation therewith separable segmental web flanges having coöperating eccentric apertures, to be opposed to, and engaged with, the hub eccentrics, this furnishing a convenient self-centering action in whichever direction the rotatable members may be actuated, and the web flanges being capable of being secured conveniently to the other web portions of a wide variety of rotatable members, such as pulleys, and especially split pulleys.

The various features of our invention will be illustrated and described fully in the accompanying drawings and specification and pointed out in the claims.

In the drawings, Figure 1 illustrates in side elevation a split pulley secured to a shaft and in the construction of which our improvements have been embodied; Fig. 2 shows in side elevation, similar to Fig. 1, one of the members of the pulley shown in Fig. 1, the other member being omitted; Fig. 3 is a view in inside elevation, looking from right to left, of Fig. 2; and Fig. 4 is a view similar to Fig. 3, of the other half of the pulley, with the hub omitted; Fig. 5 is a view, in rear elevation, of one segment of the hub and bushing; Fig. 6 is a view in perspective of one of the web flanges taken separately; Fig. 7 is a plan view of one of the connecting pins taken separately; Fig. 8 is a view in end elevation of the hub members, bushing members and shaft in position, for assembly; Fig. 9 is a view similar to Fig. 1 of a modified form of construction of pulley and connecting parts; Fig. 10 is a view in side elevation of the pulley halves taken separately in position for assembly;

and Fig. 11 is a view in inside elevation of one of the segments. Figs. 12 and 13 show in perspective and elevation respectively a web flange segment and a hub segment from Fig. 10.

In the embodiment of our invention selected for illustration and description to enable ready and complete understanding of our improvements, the part designated by the reference numeral 1 is a hub-member, which in accordance with our invention is provided with wedging means which, in the instance illustrated, takes the form of eccentric portions 2, and oppositely placed eccentric portions 3, the numeral 4 (see Fig. 8) designating a similar hub-member with eccentric portions 5 and 6, presented substantially at the opposite side of the hub's diameter from the eccentrics 2 and 3. These hub-members preferably have semi-circular, axial, recesses 7 to permit the hub to receive a suitable shaft, such as that shown at 8, and preferably one or both of the hub-members will be provided with semi-circular bushings 9 recessed at 10 respectively to receive snugly the shaft 8, these bushings being provided preferably with suitable fastening means, such as the sharpened pins 12 (see Fig. 5), to engage the periphery of the shaft and aid in retaining the hub in adjusted position against the ordinary torsional strain prior to the coupling action to be described later.

Suitable fastening means, such as the pins shown at 13, may extend from the hub portions 1 and 4 into recesses 14 in their respective bushings, to hold these parts together as a unitary structure so far as rotation relatively to the shaft is concerned, or displacement thereon co-axially, and preferably the hub members will be provided with lugs 15 through which may be passed suitable fastening means, such as the bolts 16, (see Fig. 2) to retain the hub-members in assembled relation, with their bushings in place. The size of each bushing may, and preferably will, correspond with the size of the shaft upon which the pulley is to be placed, and a hub-member of any given size may receive bushings adapted to fit a considerable variety of sizes of shaft, the only variation necessary being in the semi-circular axial recesses of the bushings.

The same pair of hub-members may receive any suitable form of coöperating rotatable member which is to be coupled with the hub for co-rotation with the shaft, as, for example any suitable form of pulley, of any suitable width and diameter, the variations in size and form being susceptible of wide adaptation to the needs of various situations, and this permits a dealer to meet the needs of customers having a considerable difference in the size of shafts and pulleys by keeping in stock a relatively small number of sizes of hub-members provided with our improved wedging devices, which we will now describe more in detail.

When, as we prefer, the wedge devices take the form of eccentrics with their greatest radii approximately 180° apart, this being the distance between the high point of the eccentric 2 in each instance relatively to the high point of the eccentric 3 in each instance, we may, and preferably will, provide the web of the pulley with coöperating and correspondingly disposed eccentric portions 30 and 31 (see Figs. 3, 4 and 6), which in the instance illustrated, are formed by the walls of apertures, semi-circular in shape, in what we will designate for the sake of brevity the web flanges 33 and 34, not intending by that expression to limit ourselves to any technical significance, the term "web" being used herein to designate that part of the pulley which intervenes between the hub and the rim 40.

The drawings illustrate as one convenient form of pulley a wooden structure comprising the web portion 35, upon, and connected with which, may be built up to any desired width the rim 40 which derives its support from the web.

The web flanges 33 and 34 may be secured to the web portion 35, when selection shall have been made of the latter portion of suitable material, size and shape, by any suitable means, as for example by rivets 36, bolts 37 or screws 38 preferably passing from one flange 33 to the other flange 34 through the intervening web portion 35, these fastening means preferably being flush with the surface of the flanges, or presenting the minimum projection therebeyond, and similarly we prefer to confine within the limits of the flange surfaces such means as may be provided to unite the pulley segments, when as will frequently be the case, the pulley takes the form of a split pulley, for which our invention is of particular utility. In the instance illustrated this connection takes the form of lugs 50 with apertures 51, these lugs preferably being so arranged as to be embraced between the flanges on the opposite segment of the pulley, in which flanges, corresponding apertures 52 may be provided in position to register with the apertures 51 and thus permit the introduction of suitable fastening devices such as the pins 53 which operate in the manner best illustrated in Figs. 1 and 3. Preferably the inner margins of the web portions 35 will be cut away as at 39 to clear the lugs projecting therein from the neighboring segment.

The eccentric portions may be of any suitable contour and of any suitable construction and arrangement relatively to each other, and as one convenient form of construction we have shown each half of the hub, viz. 1 and 4, as constituted by an integral metallic member, suitably formed as by casting or forging, and machined, if necessary, to present suitable eccentric surfaces, and these surfaces are shown as formed in pairs arranged relatively near the ends of the hub-member, that is, the surfaces 2 constitute a pair of like eccentric portions, one at one end of the hub and the other at the other end of the hub, while the surfaces 3 are similarly disposed near the ends of the hub, but beyond the surfaces 2, the two sets of surfaces being separated preferably by intervening walls 55, (see Fig. 3) which preferably enter grooves or depressions 56 and 57 in the web flanges and serve to aid in locating the hub against its seat upon the pulley, and to maintain the hub in proper position to present its eccentric surfaces 2 and 3 in direct opposition to the coöperating opposed eccentric surfaces formed upon the web flanges at 30 and 31. The width of bearing thus secured for the hub gives very considerable lateral stability to the pulley, when as in the instance illustrated the pulley has a single web located medially with respect to the rim.

We have shown in Figs. 10, 11 and 12 a modified form of pulley having a plurality of webs 60 and 61 with a rim 62 around their periphery, and web flanges 63, 64, 65 and 66 secured suitably as by rivets at 67 to the webs and having respectively apertured lugs 68 to receive pins 69 to connect the web segments in the manner already described with respect to the pins 53. Each of the web flanges illustrated in Figs. 10, 11 and 12 is formed of a single plate having semi-circular apertures 70, the plates being so placed upon the web segments that the apertures are eccentric to the pulley. Such a device may be used with the hub-members 1 and 4, allowing suitable separation between the web-flange plates, to receive the partitions 55, or, and preferably when web flanges are of this type, the hub 79 may be formed as illustrated in Fig. 13, which show the hub parts as having the eccentric portions 80 and 81 formed directly adjacent without any partition. This hub has a central axial aperture 84 with bushings 85 connected thereto by pins 86, the bushings having shaft receiving apertures 87 provided with set-pins 88. The hub parts have also apertured lugs 89 to permit their connection by bolts 90 as already described.

In operation, with either of the forms illustrated, the hub-members are first provided with bushings having central apertures of a size suitable for the shaft or similar member upon which the pulley is to be seated, and the hub parts are placed upon the shaft and there clamped snugly by the connecting bolts. Then the pulley segments of proper size, having their web flanges in place, are attached on both sides of the hub, with their eccentric apertures opposite the eccentric portions upon the hub, and the lugs within their sockets, after which the pins are thrust through the lugs and the pin holes in the flanges and the pulley is ready for action. As soon as power is applied to the rim of the pulley or to the shaft, in either direction, the resulting torque causes the eccentric portions upon the rotating member to be engaged almost immediately with the opposed eccentric portions upon the member to be driven and the wedging action of the two members against each other tends to force apart the web-segments, but this separating action is resisted by the pins, and consequently the pulley rotates with the shaft if the latter is the driving member or vice versa, the shaft rotates with the pulley if the pulley is the driving member. At any time, too, in order to remove the pulley from the shaft it is only necessary to turn the pulley slightly upon the shaft which will release the eccentric parts from engagement one with the other and thereupon the pins may be removed and the pulley segments withdrawn in the plane of their rotation, leaving the hub upon the shaft, so that a larger pulley can be readily placed upon it, or if desired, the hub can be readjusted or removed and replaced upon any shaft and its place may be taken by a different hub. The hubs and their pulleys may be placed closely adjacent to other hubs and pulleys upon the same shaft.

Having described our invention thus fully and suitable means for carrying the same into effect, it will be understood that we do not limit ourselves to the specific materials or form of construction selected for illustration and description herein nor in general than as set forth in our claims read in connection with this specification.

What we claim and desire to secure by Letters Patent is:—

1. In a power transmitting device of the class described; a wedging member having oppositely-facing eccentric ridges; a coöperating wedging member having corresponding oppositely facing eccentric ridges to be engaged with said first-mentioned eccentric ridges, said ridges constituting positioning means.

2. In means for coupling rotatable devices, a wedging member having eccentric ridges whose high points are diametrically opposite, a coöperating wedging member having correspondingly arranged eccentric ridges in coöperative relation to the first-named eccentrics; and a ridge on one of these members engaging a recess in the other to position them.

3. In means for coupling rotatable devices, a shaft, a bushing thereon, means in the bushing to engage the shaft, a plurality of segments applied to the bushing and each having a plurality of oppositely facing eccentric ridges, means to connect the segments about the bushing, and eccentric flanges having ridges engaged ridge for ridge with the eccentrics on the segments.

Signed at Buffalo in the county of Erie and State of New York, this 16th day of October 1909.

DAVID W. SOWERS.

Witnesses:
 BERTHA KERR,
 GEORGE M. BLACKMON.

Signed at Grimsby in the county of Lincoln and Province of Ontario, this 16 day of October 1909.

HUGH D. WALKER.

Witnesses:
 FLOSSIE W. SMYE,
 W. W. KIDD.

Copies of this patent may be obtained for five cents each, by addressing the "Commissioner of Patents, Washington, D. C."